(12) United States Patent
Horimai et al.

(10) Patent No.: US 7,518,973 B2
(45) Date of Patent: Apr. 14, 2009

(54) HOLOGRAPHIC OPTICAL INFORMATION REPRODUCING APPARATUS

(75) Inventors: Hideyoshi Horimai, Kanagawa (JP); Yoshio Aoki, Kanagawa (JP)

(73) Assignee: Optware Corporation, Kanagawa (JP)

( * ) Notice: Subject to any disclaimer, the term of this patent is extended or adjusted under 35 U.S.C. 154(b) by 498 days.

(21) Appl. No.: 10/887,173

(22) Filed: Jul. 8, 2004

(65) Prior Publication Data

US 2005/0036436 A1 Feb. 17, 2005

(30) Foreign Application Priority Data

Jul. 8, 2003 (JP) ............... 2003-193963

(51) Int. Cl.
*G11B 7/0065* (2006.01)
(52) U.S. Cl. .................................... 369/103
(58) Field of Classification Search ................ 369/118, 369/112.16, 112.17, 103; 359/11; *G11B 7/00; G03H 1/00*
See application file for complete search history.

(56) References Cited

U.S. PATENT DOCUMENTS 6,909,529 B2 * 6/2005 Curtis .......................... 359/30
7,064,875 B2 * 6/2006 Kawano et al. ................ 359/11
7,315,501 B1 * 1/2008 Ramanujam et al. ........ 369/103

FOREIGN PATENT DOCUMENTS

JP 11-311938 11/1999

* cited by examiner

*Primary Examiner*—Michael V Battaglia
(74) *Attorney, Agent, or Firm*—William L. Androlia; H. Henry Koda (57) ABSTRACT

It is an object of the invention to provide an optical information reproducing apparatus and an optical information storing/reproducing apparatus which utilize holography, wherein noise due to reference light is reduced than in conventional apparatuses. An optical system in which arrangement is made so that at least part of a light path of reference light for reproduction is redundant with a light path of reproduction light, and a means to let through the reproduction light and shut out reflected light of the reference light for reproduction, which is reflected by a storage medium on the redundant path are provided.

5 Claims, 6 Drawing Sheets

HOLOGRAPHIC OPTICAL INFORMATION REPRODUCING APPARATUS

BACKGROUND OF THE INVENTION

1. Field of the Invention

The present invention relates to an optical information reproducing apparatus which reproduces information stored in an information storage layer of a storage medium utilizing holography by illuminating the storage medium with reference light for reproduction; and an optical information storing/reproducing apparatus which stores information in an information storage layer of a storage medium by utilizing interference between information light carrying the information by spatial modulation and reference light for storage, and reproduces the stored information by illuminating the storage medium with reference light for reproduction.

2. Description of the Art

Conventionally, holographic storage which stores information in a storage medium by utilizing holography has been generally performed by overlapping information light carrying image information and reference light for storage in an information storage layer of the storage medium, and writing a resultant interference pattern in the storage medium. When the information which is stored in the information storage layer of the storage medium by utilizing the holography as above is reproduced, the storage medium is illuminated with reference light for reproduction, the reference light for reproduction is diffracted by the interference pattern in the information storage layer, reproduction light carrying the image information that the information light carried when the information was stored is generated, and therefore the image information is reproduced by detecting this reproduction light (refer to Japanese Unexamined Patent Application Publication No. H11-311938).

The reproduction light tracks back a light path of the reference light for reproduction. In the middle of the light path, the reproduction light is separated from the light path of the reference light for reproduction by a polarizing beam splitter, and proceeds toward a detector. Therefore, major part of the light path of the reproduction light is redundant with the light path of the reference light for reproduction.

When the information stored by using the conventional holographic storage is reproduced, much noise is found. One of the reasons for the noise is that not only the reproduction light having the image information, but also reflected light of the reference light for reproduction, which is reflected by a reflection layer of the storage medium is detected together with the reproduction light.

In order to reduce this noise, it has been considered to provide an aperture which removes the reflected light of the reference light for reproduction. However, as mentioned above, major part of the light path of the reference light for reproduction is redundant with the light path of the reproduction light. When the aperture is arranged at the redundant part, the reference light for reproduction itself which enters the storage medium is also shut out.

Therefore, the aperture has been conventionally arranged on the light path of the reproduction light only to remove the reflected light.

The conventional aperture to remove the reflected light is arranged on the light path of the reproduction light only. In this case, a distance between a reflection position of the reflected light and the aperture is long, and the reflected light is scattered in the middle of the distance. Therefore, the reflected light has not been removed sufficiently by the aperture.

Further, it is thinkable that not only the interference pattern is generated between the information light and the reference light for storage, but also an interference pattern is generated between the reference light for storage may arise, and this interference pattern between the reference light for storage may be stored as noise. As well as the interference between the reference light for storage which enters the storage medium, interference between the reflected light of the reference light for storage, which is reflected by the reflection layer of the storage medium is generated.

SUMMARY OF THE INVENTION

It is an object of the invention to provide an optical information reproducing apparatus and an optical information storing/reproducing apparatus which utilize holography, wherein noise due to reference light is reduced than in conventional apparatuses.

[Means to Solve the Problem]

In order to attain the foregoing object, an optical information reproducing apparatus of the invention is an optical information reproducing apparatus in which a storage medium storing information in an information storage layer as an interference pattern is illuminated with reference light for reproduction and resultant reproduction light is detected to reproduce the information, wherein an optical system in which arrangement is made so that at least part of a light path of the reference light for reproduction is redundant with a light path of the reproduction light; and a means to let through the reproduction light and shut out reflected light of the reference light for reproduction, which is reflected by the storage medium on the redundant path are provided.

Since such a construction is adopted, the reflected light of the reference light for reproduction which is reflected by the storage medium can be shut out on the redundant path, and noise due to scatter of the reflected light can be reduced. Meanwhile, since the foregoing means lets through the reproduction light, the means has no effect on information reproduction even when the means is arranged on the redundant path.

Further, the optical information reproducing apparatus of the invention is characterized in that the means comprises a polarization plate which has an opening to let through the reproduction light without polarization and which can polarize the reference light for reproduction; and an one fourth wavelength plate which is arranged on a light path closer to the storage medium side than the polarization plate is.

When such a construction is adopted, reference light for reproduction which passed the polarization plate is reflected as polarized light perpendicular to a plane of polarization of the polarization plate by the one fourth wavelength plate arranged on the light path on the storage medium side. Therefore, reflected light of the reference light for reproduction can be removed by the polarization plate. Since the reproduction light passes the opening of the polarization plate, the reproduction light is not shut out by the polarization plate even when its plane of polarization becomes perpendicular.

Further, in the optical information reproducing apparatus of the invention, the one fourth wavelength plate is preferably an one fourth wavelength layer provided inside the storage medium.

Further, the optical information reproducing apparatus of the invention is characterized in that the means is an aperture provided with an opening having a shape which lets through all of the reproduction light and part of the reference light for reproduction, and which shuts out reflected light of the part of the reference light for reproduction, which is reflected by the storage medium.

When such a construction is adopted, if reflected light of part of the reference light for reproduction which passed the aperture is generated by being reflected by the reflection layer of the storage medium, the reflected light can be removed by the shape of the aperture which shuts out the reflected light. Further, since all of the reproduction light can pass the aperture, arranging the aperture on the redundant path has no effect on reproduction.

Further, in the optical information reproducing apparatus of the invention, it is preferable that a part of the aperture to let through the part of the reference light for reproduction and a part of the aperture to shut out the reflected light of the reference light for reproduction are symmetrical about a point centering on an optical axis.

When such a construction is adopted, a shape of the reference light for reproduction which passes the aperture and a shape of the part to shut out the reflected light placed on the opposite side centering on the optical axis become equal. Reproduction efficiency is improved and the reflected light can be effectively removed.

Further, an optical information storing/reproducing apparatus of the invention is an optical information storing/reproducing apparatus in which information light carrying information by spatial modulation interferes with reference light for storage in an information storage layer of a storage medium and the information is stored by the interference pattern; and the information storage layer is illuminated with reference light for reproduction and resultant reproduction light is detected to reproduce the information, wherein an optical system in which arrangement is made so that a light path of the information light, a light path of the reference light for storage, a light path of the reference light for reproduction, and a light path of the reproduction light are redundant with each other in at least part thereof; and a means to let through the information light and the reproduction light, and shut out reflected light of the reference light for reproduction, which is reflected by the storage medium on the redundant light path are provided.

Since such a construction is adopted, the reflected light of the reference light for reproduction, which is reflected by the storage medium can be shut out on the redundant light path, and noise due to scatter of the reflected light can be decreased. Meanwhile, since the information light and the reproduction light can pass the means, the means has no effect on storage and reproduction of information even if the means is arranged on the redundant light path.

Further, the optical information storing/reproducing apparatus is characterized in that the means comprises a polarization plate which has an opening to let through the information light and the reproduction light without polarization and which can polarize the reference light for reproduction; and an one fourth wavelength plate which is arranged on a light path closer to the storage medium side than the polarization plate is.

When such a construction is adopted, reference light for reproduction which passed the polarization plate is reflected as polarized light perpendicular to a plane of polarization of the polarization plate by the one fourth wavelength plate arranged on the light path on the storage medium side. Therefore, reflected light of the reference light for reproduction can be removed by the polarization plate. Since the information light and the reproduction light pass the opening of the polarization plate, arranging the polarization plate on the redundant light path does not work against storage and reproduction of information.

Further, the optical information storing/reproducing apparatus of the invention is characterized in that the one fourth wavelength plate is an one fourth wavelength layer provided inside the storage medium.

When such a construction is adopted, polarization of light to store an interference pattern to store information is different from polarization of the reflected light of the reference light for storage. Therefore, influence of noise due to interference between the reflected light of the reference light for storage can be reduced.

The optical information storing/reproducing apparatus of the invention is characterized in that the means is an aperture provided with an opening having a shape which lets through all of the information light, all of the reproduction light, and part of the reference light for reproduction, and which shuts out reflected light of the part of the reference light for reproduction, which is reflected by the storage medium.

When such a construction is adopted, if reflected light of the part of part of the reference light for reproduction which passed the aperture is generated by being reflected by the reflection layer of the storage medium, the reflected light can be removed by the shape of the aperture to shut out the reflected light. Further, all of the information light and all of the reproduction light can pass the aperture. Therefore, arranging the aperture on the redundant light path does not have effects on storage and reproduction. In addition, a light path of the reference light for storage in storing information is the same as the light path of the reference light for reproduction. Therefore, only part of the reference light for reproduction passes, interference between the reference light for reproduction is hard to arise, and interference between the reflected light of the reference light for reproduction is hard to arise. In result, noise due to storing wrong information can be reduced.

Further, the optical information storing/reproducing apparatus of the invention is characterized in that a part of the aperture to let through the part of the reference light for reproduction and a part of the aperture to shut out the reflected light of the reference light for reproduction are symmetrical about a point centering on an optical axis.

When such a construction is adopted, a shape of the reference light for reproduction which passes the aperture and a shape of the part to shut out the reflected light, which is placed on the opposite side centering on the optical axis become equal. Therefore, reproduction efficiency is improved, and the reflected light can be effectively removed.

DETAILED DESCRIPTION OF THE PREFERRED EMBODIMENT

Figure 1:
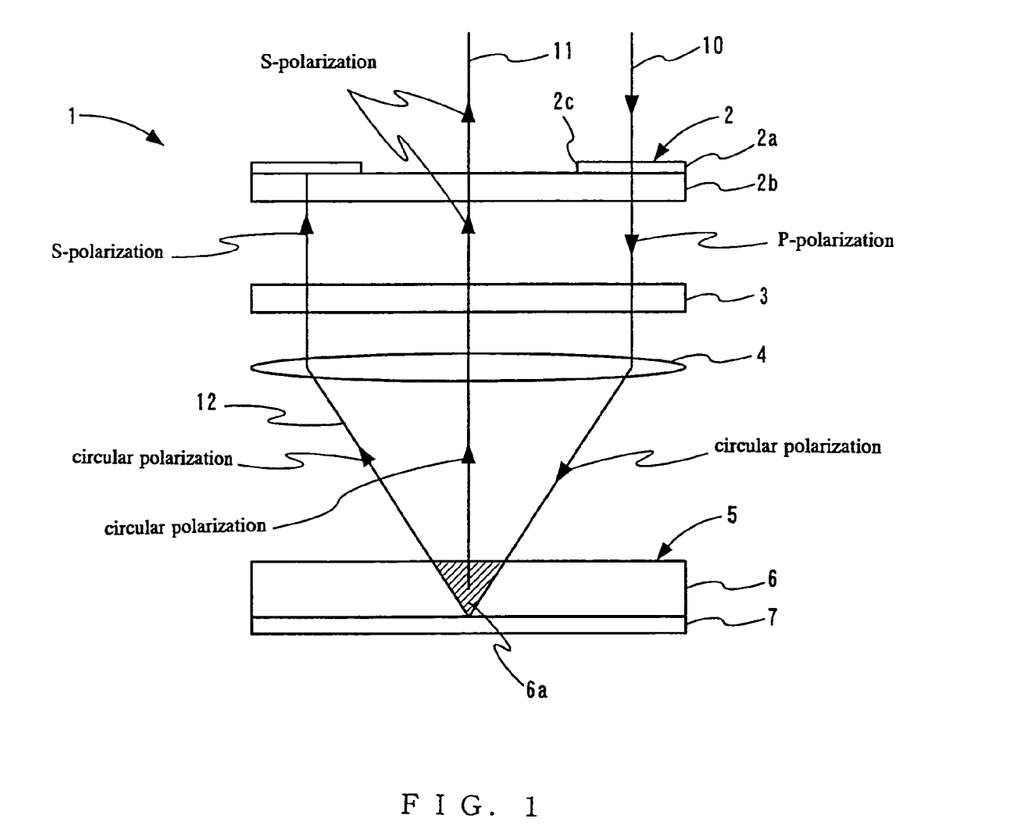
FIG. 1 is an outline cross sectional view showing a mode of a means to let through reproduction light and shut out reflected light of reference light for reproduction.

Descriptions will be hereinafter given of an embodiment of the invention with reference to the drawings. FIG. 1 shows a mode of a means 1 to let through reproduction light, or information light and the reproduction light, and shut out reflected light of reference light for reproduction, which is reflected by a storage medium. The means 1 has a polarization plate 2 and a one fourth wavelength plate 3. As the polarization plate 2, the polarization plate in which a polarization film 2a is layered on a substrate 2b can be adopted as shown in FIG. 1. The polarization plate 2 is provided with an opening 2c so that the reproduction light is not be polarized in an optical information reproducing apparatus, and the information light and the reproduction light are not polarized in an optical information storing/reproducing apparatus. The opening 2c of the polarization plate 2 means a part of the polarization plate 2 where no light is polarized, and is not always a physical hole. Needless to say, it is possible to form a physical hole as the opening 2c. In FIG. 1, the opening 2c of the polarization plate 2 is formed by removing part of the polarization film 2a.

Figure 2:
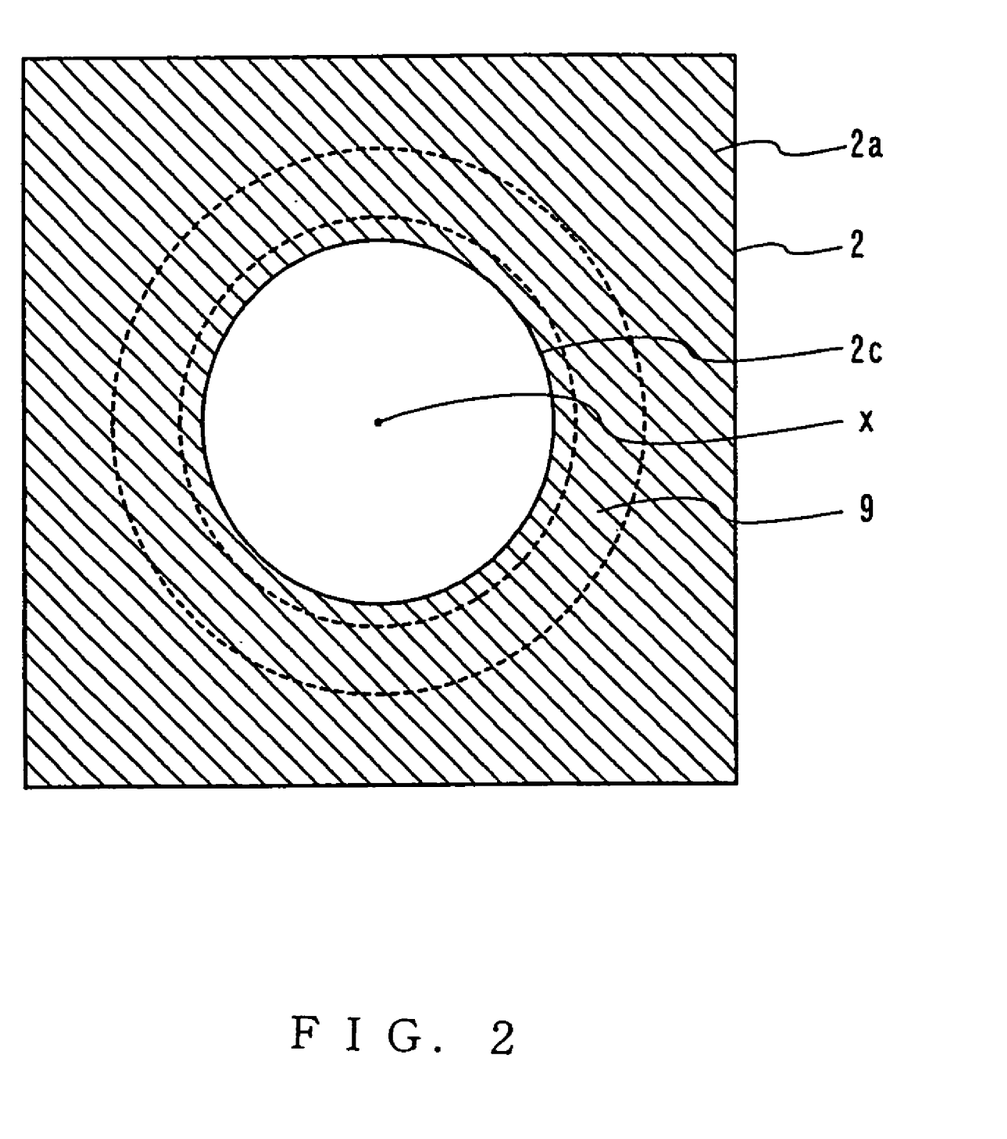
FIG. 2 is a plane view of a polarization plate of the invention.

FIG. 2 is a drawing showing an example of the opening 2c. FIG. 2 is a plane view of the polarization plate 2 seen from the direction of an optical axis. In FIG. 2, a circular opening 2c centering on an optical axis x of the polarization plate 2 is provided. In other part of the polarization plate 2, the polarization film 2a (shaded portion) is provided. In FIG. 2, the reproduction light, or the information light and the reproduction light pass the circular opening 2c centering on the optical axis x, and the reference light for reproduction passes a toric region 9 which is arranged around the opening 2c (shown in dotted lines in FIG. 2). Therefore, the reference light for reproduction can be polarized by the polarization plate 2. The reference light for reproduction can be polarized since the reference light for reproduction passes a part where a light polarizer exists. However, the reference light for reproduction is often previously processed as the same linearly polarized light as a plane of polarization of the polarization plate 2. Therefore, in some cases, polarization by the polarization plate 2 is not performed actually.

The one fourth wavelength plate 3 is arranged on a light path closer to the storage medium side than the polarization plate 2 is. The one fourth wavelength plate 3 is a phase plate to change, by one fourth wavelength, a difference of light paths of polarized light oscillating in the directions perpendicular to each other. P polarized light is changed into circular polarized light by the one fourth wavelength plate 3. Further, when this circular polarized light passes the one fourth wavelength plate 3, the circular polarized light is changed into S polarized light. In FIG. 1, the one fourth wavelength plate 3 is arranged between the polarization plate 2 and an objective lens 4. However a position of the one fourth wavelength plate 3 is not limited to this position.

When reference light for reproduction 10 which comes from an unshown light source and which is formed by still an unshown optical system enters the polarization plate 2, only polarized light which corresponds with the plane of polarization of the polarization plate 2 passes through the polarization plate 2. FIG. 1 shows an example that the polarization plate 2 lets through the P polarized light. Therefore, reference light for reproduction which passed the polarization plate 2 is the P polarized light. For convenience of explanation, only the reference light for reproduction 10 which enters the left side is shown in FIG. 1. However, the toric region 9 in FIG. 2 is actually illuminated with the reference light for reproduction 10.

After the reference light for reproduction of P polarized light passes the one fourth wavelength plate 3, the reference light for reproduction of P polarized light becomes circular polarized light. This reference light for reproduction of circular polarized light enters a storage region 6a of an information storage layer 6 of a storage medium 5 through the objective lens 4. The entered light is diffracted by an interference pattern stored in the storage region 6a, and generates reproduction light 11 of circular polarized light having image information which was carried by the information light when information was stored. The reference light for reproduction of circular polarized light is reflected by a reflection layer 7 of the storage medium 5, and generates reflected light 12 of circular polarized light.

The generated reproduction light 11 and the generated reflected light 12 pass the objective lens 4, become a bundle of parallel rays, pass the subsequent one fourth wavelength plate 3 to become from circular polarized light to S polarized light. Therefore, the reflected light of the reference light for reproduction which has passed the polarization plate 2 is to enter, in the state of S polarized light, the polarization plate 2 which lets through only P polarized light. Therefore, this reflected light of the reference light for reproduction is shut out by the polarization plate 2. On the other hand, though the reproduction light 11 is also S polarized light, the reproduction light 11 enters the opening 2c provided for the polarization plate 2. Therefore, the reproduction light 11 can pass the polarization plate 2.

As above, the reflected light 12 of the reference light for reproduction can be shut out where the light paths are redundant. Therefore, the reflected light 12 can be removed before the reflected light 12 is scattered. In result, noise due to scattered reflected light can be reduced.

Figure 3:
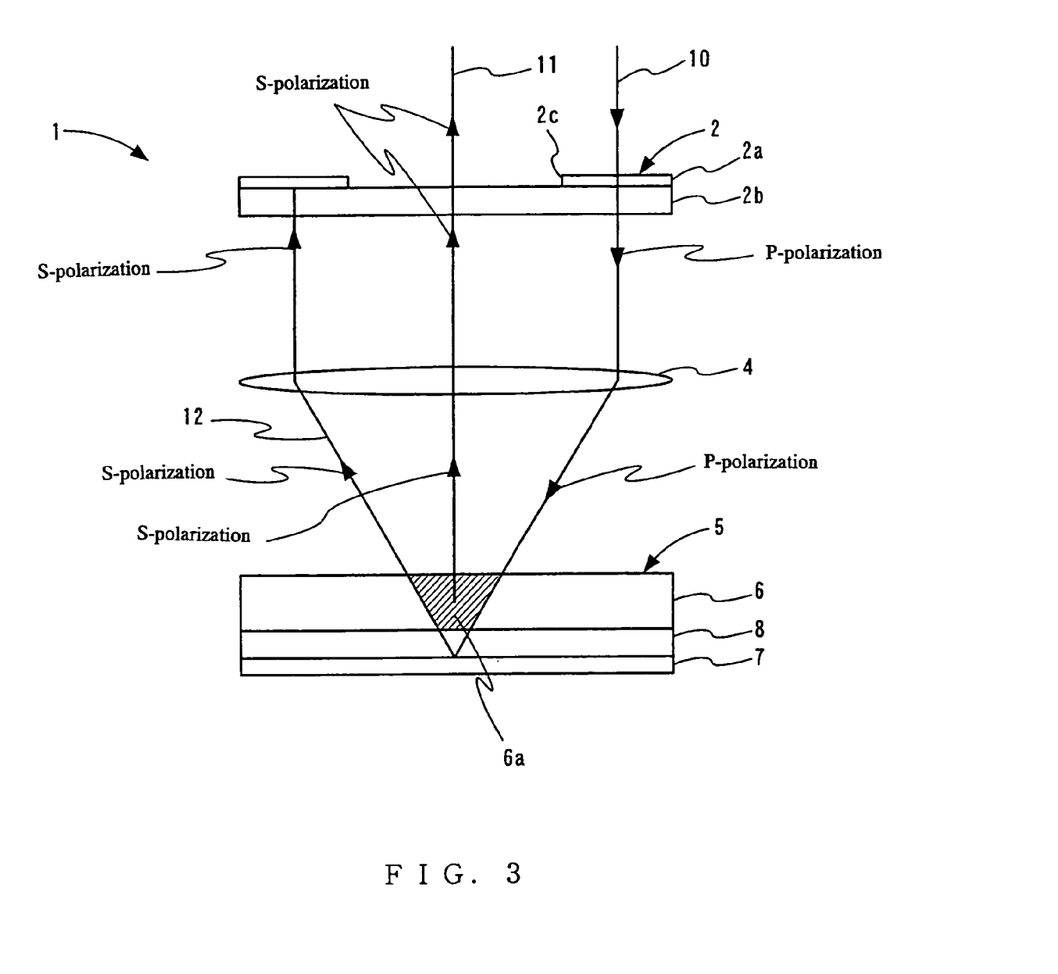
FIG. 3 is an outline cross sectional view showing another mode of a means to let through the reproduction light and shut out the reflected light of the reference light for reproduction.

FIG. 3 is a variant example of the means 1 of FIG. 1. In FIG. 3, a one fourth wavelength layer 8 is sandwiched between the information storage layer 6 and the reflection layer 7 in the storage medium 5. This one fourth wavelength layer 8 functions as a one fourth wavelength plate. In this case, the one fourth wavelength layer 8 of the storage medium 5 also works as a part of a construction to remove the reflected light 12 of the reference light for reproduction in the optical information reproducing apparatus.

In FIG. 3, when the reference light for reproduction 10 enters the polarization plate 2, only polarized light corresponding with P polarized light which is the plane of polarization of the polarization plate 2 passes through the polarization plate 2. The reference light for reproduction of P polarized light enters the storage region 6a of the information storage layer 6 of the storage medium 5 through the objective lens 4, is diffracted by an interference pattern stored in the storage region 6a, and generates the reproduction light 11 having the image information which the information light carried when information was stored. The reference light for reproduction of P polarized light enters the one fourth wavelength layer 8, is reflected by the reflection layer 7, and becomes the reflected light 12. Since the reflected light 12 previously went to and from the one fourth wavelength layer 8, the reflected light 12 which exits from the one fourth wavelength layer 8 is S polarized light. (One roundtrip through the one fourth wavelength layer 8 is the same as two passages through the one fourth wavelength layer 8.)

Therefore, the reflected light 12 of the reference light for reproduction which passed the polarization plate 2 enters, in a state of S polarized light, the polarization plate 2 which lets through only P polarized light. Therefore, the reflected light 12 is shut out by the polarization plate 2. On the other hand, since the opening 2c which can let through the reproduction light 11 is provided for the reproduction light 11, the reproduction light 11 is not affected by the polarization plate 2. The reproduction light 11 is also generated by the reference light for reproduction of P polarized light, and therefore the reproduction light 11 is initially P polarized light. However, this P polarized light afterward goes to and from the one fourth wavelength layer 8, and therefore is changed into S polarized light finally.

As above, the reflected light 12 of the reference light for reproduction can be shut out where the light paths are redundant. Therefore, the reflected light 12 can be removed before the reflected light 12 is scattered. In result, noise due to scattered reflected light can be reduced.

Further, when the one fourth wavelength layer 8 in the storage medium 5 is utilized as a one fourth wavelength plate, influence of noise caused by interference between reflected light of reflection light for storage in storing information can be reduced. The reason thereof is as follows. The reference light for storage in storing information has passed the same light path as the foregoing light path of the reference light for reproduction, and therefore the reference light for storage is P polarized light when the reference light for storage enters the storage medium 5. An interference pattern between the information light and the reference light for storage of P polarized light is stored as information in the information storage layer 6. On the other hand, reflected light of the reference light for storage goes to and from the one fourth wavelength layer 8 to become S polarized light. Therefore, the interference pattern between the information light and the reference light for storage of P polarized light which is reproduced by the reference light for reproduction of P polarized light has different polarization from of the interference pattern between the reflected light of S polarized light. In result, the interference between the reflected light of the reference light for storage is hard to become noise for the reference light for reproduction of P polarized light.

Figure 4:
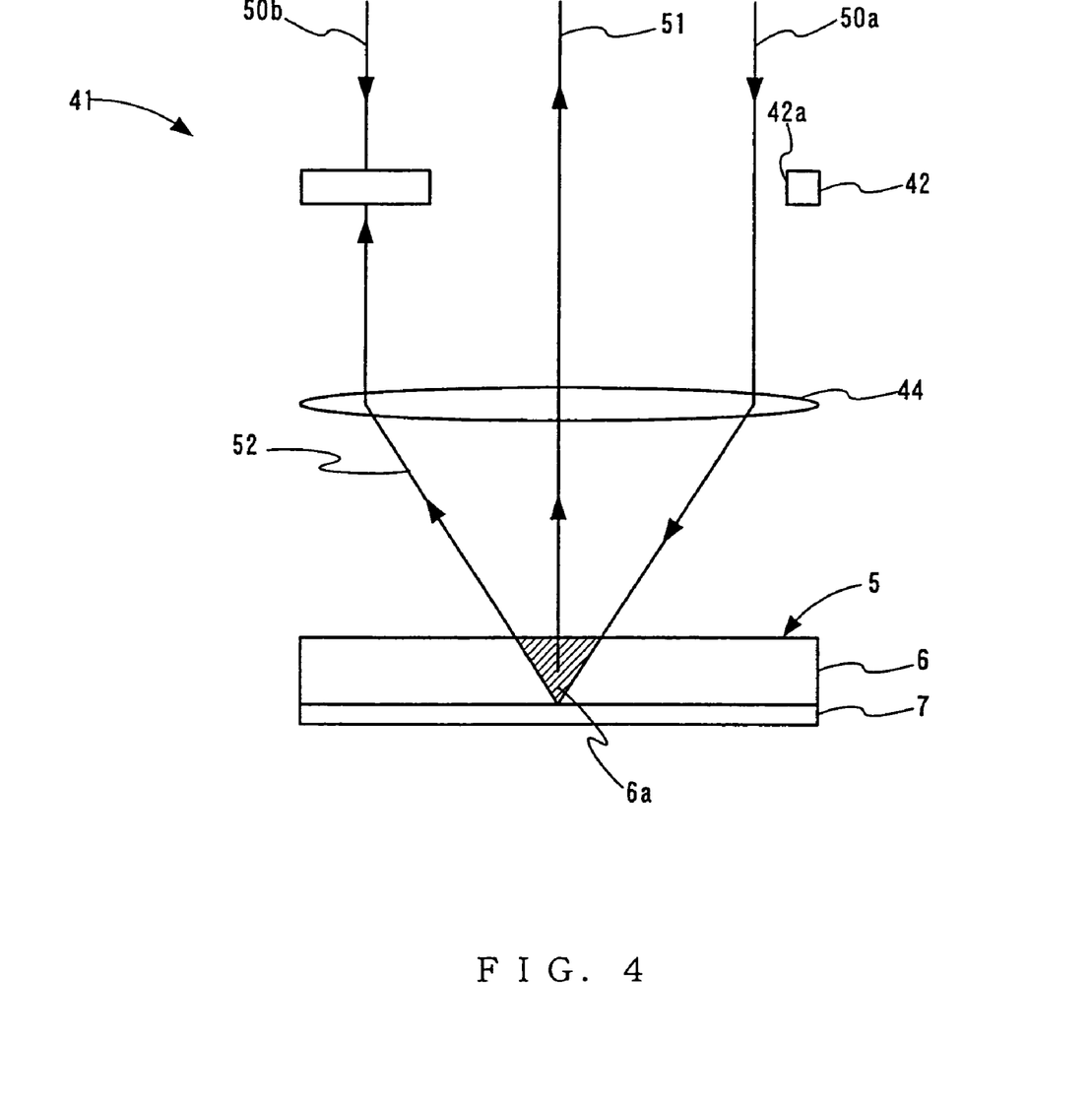
FIG. 4 is An outline cross sectional view showing still another mode of a means to let through the reproduction light and shut out the reflected light of the reference light for reproduction.

FIG. 4 shows other mode, a means 41 which lets through the reproduction light, or the information light and the reproduction light, and shuts out the reflected light of the reference light for reproduction. The means 41 has an aperture 42. The aperture 42 comprises an opening 42a in the shape which lets through all of reproduction light 51 and part of reference light for reproduction 50a, and shuts out reflected light 52 of the part of the reference light for reproduction 50a, which is reflected by the storage medium 5.

A shape of the aperture 42 is preferably a shape, wherein a part to shut out the reflected light of the reference light for reproduction can be provided on the side opposite of a part to let through the part of the reference light for reproduction 50a, centering on an optical axis, and the part to let through the part of the reference light for reproduction and the part to shut out the reflected light of the reference light for reproduction are formed symmetrically about a point centering on the optical axis.

Figure 5:
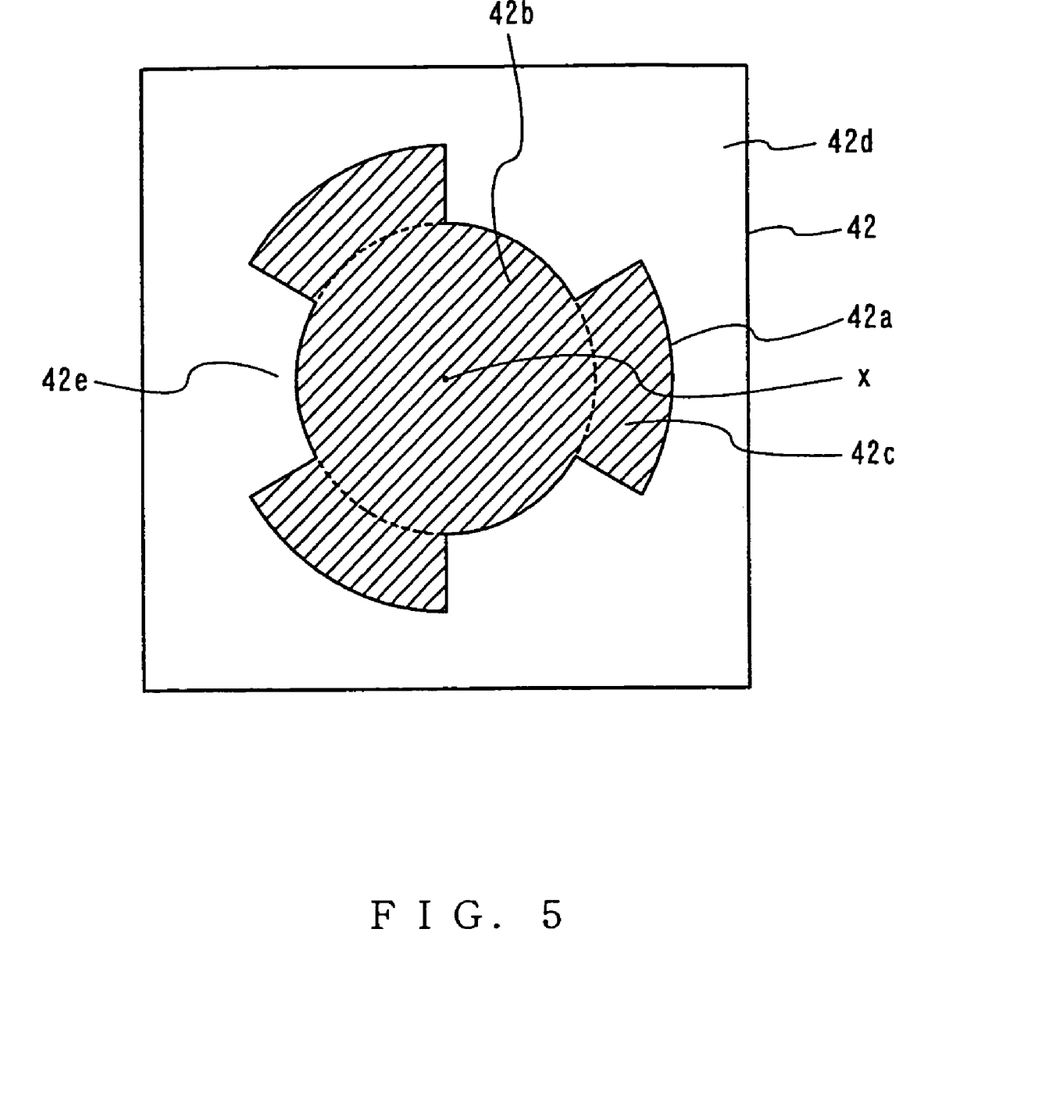
FIG. 5 is A plane view of an aperture of the invention.

FIG. 5 is a drawing showing an example of the aperture 42. FIG. 5 is a plane view of the aperture 42 seen from the optical axis direction. In FIG. 5, the aperture 42 has the opening 42a in the shape of combination of a circular part centering on an optical axis x, 42b (part of the circle is shown in dotted lines), and a part to let through the reference light for reproduction 42c. A region 42d other than the opening 42a is a material to shut out light. Clearances between the parts to let through the reference light for reproduction 42c are parts to shut out the reflected light of the reference light for reproduction 42e. In FIG. 5, the reproduction light, or the information light and the reproduction light pass an opening of the circular part centering on the optical axis x, 42b, and the part of the reference light for reproduction 50a passes an opening of the part to let through the reference light for reproduction 42c. Other reference light for reproduction 50b is shut out by the region 42e, and does not reach the storage medium.

In FIG. 4, when reference light for reproduction 50 which comes from an unshown light source, and which is formed by still an unshown optical system enters the aperture 42, the reference light for reproduction 50a can pass the part to let through the reference light for reproduction 42c of the aperture 42, and the reference light for reproduction 50b is shut out at the part to shut out the reflected light of the reference light for reproduction 42e. Therefore, the part of the reference light for reproduction 50a passes.

The passed reference light for reproduction 50a enters the storage region 6a of the information storage layer 6 of the storage medium 5 through the objective lens 44, is diffracted by the interference pattern stored in the storage region 6a, and generates the reproduction light 51 having the image information which the information light carried when information was stored. The part of the reference light for reproduction 50a is reflected by the reflection layer 7 of the storage medium 5, and generates reflected light 52. The reflected light 52 proceeds in the direction opposite of the direction of the part of the reference light for reproduction 50a in relation to the optical axis x. Therefore, the reflected light 52 is shut out by the part to shut out the reflected light of the reference light for reproduction 42e, which is formed on the opposite side of the part to let through the reference light for reproduction 42c, centering on the optical axis x. The opening 42a of the aperture 42 means a part of the aperture 42 where light can be let through, and is not always a physical hole. Needless to say, it is possible to form a physical hole as the opening 42a.

As above, the reflected light 52 of the reference light for reproduction can be shut out where the light paths are redundant. Therefore, the reflected light 52 can be removed before the reflected light 52 is scattered. In result, noise due to scattered reflected light can be reduced.

Further, when this aperture 42 is utilized, influence of noise caused by interference between the reference light for storage and interference between the reflected light of the reference light for storage in storing information can be reduced. The reason thereof is as follows. The reference light for storage in storing information has passed the same light path as the foregoing light path of the reference light for reproduction. On the opposite side of the reference light for storage which has passed the part to let through the reference light for reproduction 42c, the reference light for storage is shut out by the part to shut out the reflected light 42e. Therefore, influence of noise due to interference between the reference light for storage can be reduced. Further, since the passed reference light for storage does not have the opponent reference light for storage from the opposite side, influence of noise due to interference between the reflected light of the reference light for storage can be reduced.

Figure 6:
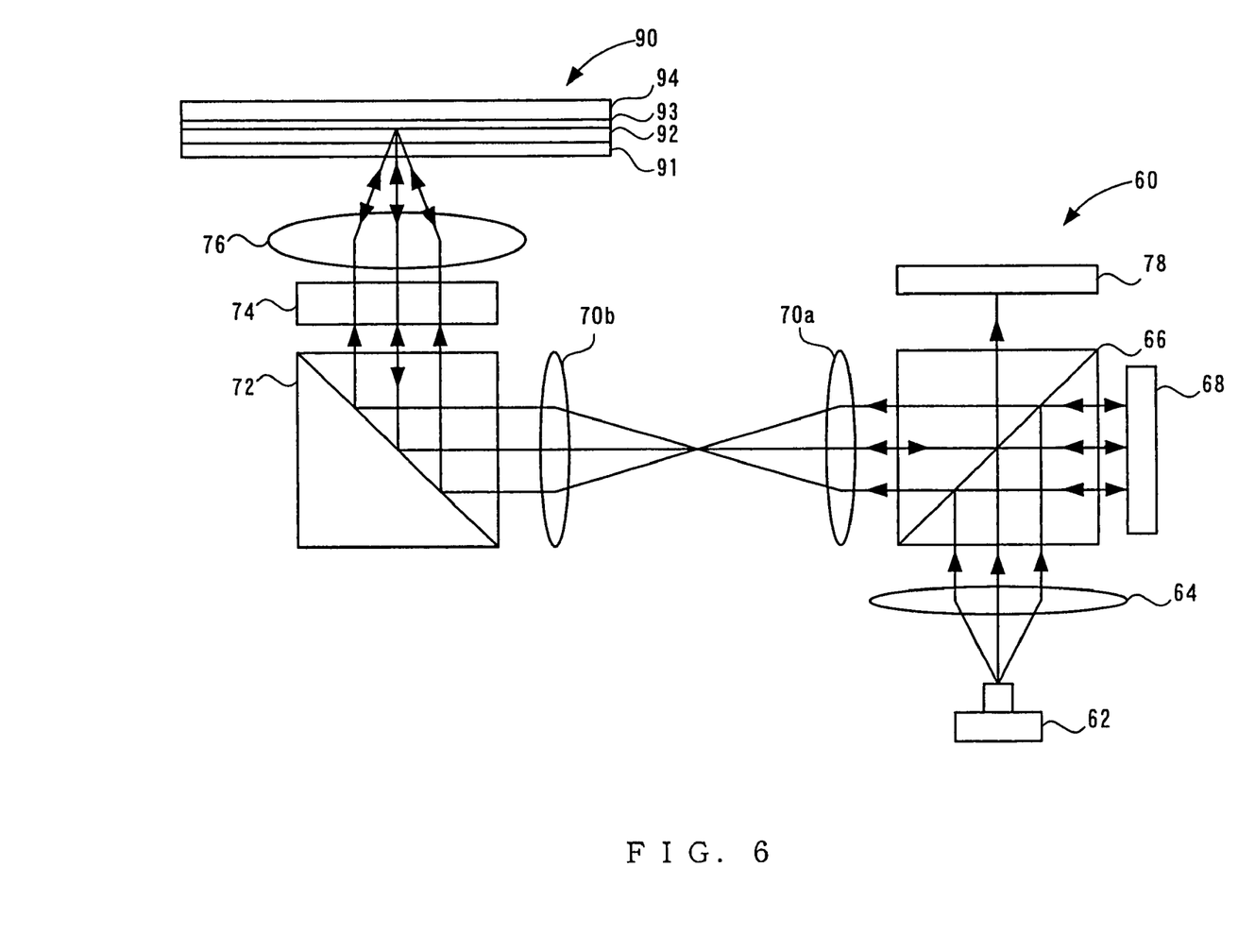
FIG. 6 is An outline cross sectional view showing a mode of an optical information storing/reproducing apparatus of the invention.

FIG. 6 is an outline cross sectional view showing a mode of an optical information storing/reproducing apparatus 60 of the invention. The optical information storing/reproducing apparatus 60 comprises a light source for storage and reproduction 62, a collimator lens 64, a polarizing beam splitter 66, a spatial light modulator (information expressive means) 68, relay lenses 70a and 70b, a mirror 72, a means to let through the information light and the reproduction light and shut out the reflected light of the reference light for reproduction 74, an objective lens 76, and a photodetector 78. In FIG. 6, a storage medium 90 is simply shown. A circular transparent substrate 91, an information storage layer 92, a reflection layer 93, and a substrate 94 are shown, and components such as pit are omitted.

As the light source for storage and reproduction 60, a device which generates a bundle of rays of coherent linearly polarized light such as a semiconductor laser can be used. For this light source for storage and reproduction 60, short wave lengths are advantageous in order to perform high density storage. It is preferable to adopt a blue laser or a green laser.

The collimator lens 64 changes the divergent bundle of rays from the light source for storage and reproduction 62 into approximately parallel rays. The polarizing beam splitter 66 is constructed so as to reflect or let through linearly polarized light (for example, P polarized light) generated from the light source for storage and reproduction 62, and let through or reflect linearly polarized light perpendicular to the polarized light in question (for example, S polarized light).

The spatial light modulator (information expressive means) 68 has many pixels arranged in the shape of a grid. It is possible to select whether a polarization direction of exit light is rotated at an angle of 90° in relation to a polarization direction of incident light or not for each pixel. As this spatial light modulator 68, for example, a reflective liquid crystal device utilizing optical rotation of liquid crystal wherein a polarization plate on the entrance and exit side is omitted can be used. This spatial light modulator 68 constructs an information light generation means, a reference light for storage generation means, and a reference light for reproduction generation means.

The relay lenses 70*a* and 70*b* are a pair of lenses, and form an image displayed at the spatial light modulator 68 as a real image again.

The mirror 72 is an optical device to forward proceeding directions of the information light, the reference light for storage, and the reference light for reproduction toward the objective lens 76. As the mirror 72, a reflecting mirror, a half mirror, a 45° rectangular prism, a pentagonal prism or the like can be adopted.

The means to let through the information light and the reproduction light and shut out the reflected light of the reference light for reproduction 74 has the construction described in FIGS. 1 to 5. This means 74 has an opening to let through the information light and the reproduction light. The means 74 shuts out the reflected light of the reference light for reproduction, which is reflected by the reflection layer 93 of the storage medium 90. As this means 74 of FIG. 6, the means 1 of FIG 1, the means 1 of the FIG. 3 and the means 41 of FIG. 4 can be used. A position of the means 74 is not fixed between the mirror 72 and the objective lens 76. However, in order to prevent the reflected light from being scattered, it is preferable to arrange the means 74 in the vicinity of the storage medium 90 as long as possible.

The objective lens 76 makes the information light, the reference light for storage, and the reference light for reproduction converge toward on the storage medium 90. A given position in the storage medium 90 is illuminated with the information light, the reference light for storage, and the reference light for reproduction by the objective lens 80.

The photodetector 78 receives the reproduction light and reproduces the stored information. The photodetector 78 has many photo acceptance devices arranged in the shape of a grid. As a photo acceptance device, a CCD array which adopts a CCD (Charge Coupled Device), a CMOS sensor which adopts a CMOS (Complementary Metal-Oxide Semiconductor) and the like can be used.

Descriptions will be given of light paths in storing and reproducing information in the optical information storing/reproducing apparatus in FIG. 6. First, a bundle of rays exiting from the light source for storage and reproduction 62 is changed into a bundle of approximately parallel rays by the collimator lens 64. The bundle of parallel rays is reflected by the polarizing beam splitter 66, and enters the spatial light modulator 68.

This spatial light modulator 68 selects whether a polarization direction is rotated at an angle of 90° or not every pixel, and displays a modulation pattern. The incident light thereby can carry given information. Information light and reference light for storage can be concurrently generated, by displaying an information pattern desired to be stored in the center of a display pattern, and displaying a toric pattern to generate the reference light for storage around the information pattern.

The resultant information light and the resultant reference light for storage pass through the polarizing beam splitter 66 and the relay lenses 70*a* and 70*b*, and proceed in the direction of the objective lens 76 through the mirror 72. Then, the information light and the reference light for storage pass the means to let through the information light and the reproduction light and shut out the reflected light of the reference light for reproduction 74, and the storage medium 90 is illuminated with the information light and the reference light for storage by the objective lens 76. In the storage medium 90, the information light interferes with the reference light for storage. An interference pattern thereof is stored in the information storage layer 92.

When information is reproduced, a pattern to generate the reference light for reproduction is displayed as a modulation pattern displayed on the spatial light modulator 68, and therefore, the reference light for reproduction is generated. The reference light for reproduction basically proceeds on the same light path as of the reference light for storage. When the storage medium 90 is illuminated with the reference light for reproduction, the reference light for reproduction is diffracted by the interference pattern stored in the information storage layer 92, and reproduction light carrying information of the interference pattern is generated. Further, reflected light of the reference light for reproduction is also generated by the reflection layer 93 of the storage medium 90.

The reproduction light is changed into a bundle of parallel rays by the objective lens 76, and passes the means to let through the information light and the reproduction light and shut out the reflected light of the reference light for reproduction 74. At the means 74, the reflected light of the reference light for reproduction, which is reflected by the reflection layer 93 of the storage medium 90 is shut out. Therefore, in FIG. 6, an arrow in the direction away from the storage medium 90, which is described in the light path is only applied to the central light path after the means 74. After that, the reproduction light is reflected by the mirror 72, passes the relay lenses 70*a* and 70*b*, is reflected by the polarizing beam splitter 66, is received by the photodetector 78, and is reproduced.

In FIG. 6, the optical information storing/reproducing apparatus to concurrently generate the information light and the reference light for storage by the spatial light modulator 68 is shown. However, it is possible that a light path for the information light and a light path for the reference light for storage are separated by a beam splitter, the information light and the reference light for storage are respectively generated, the generated information light and the reference light for storage are again united by the beam splitter, and a storage medium is illuminated with the resultant light for storage centering on the same axis. The apparatus wherein the information light and the reference light for storage are generated on their individual light paths is described in detail in Japanese Unexamined Patent Application Publication No. H11-311938.

The foregoing construction is absolutely one of the modes. Modes of the optical information storing/reproducing apparatus of the invention are not limited to the foregoing modes, and arrangement of the respective components can be changed. Further, in the case of the optical information reproducing apparatus, the storage function is omitted, a light source for reproduction is adopted instead of the light source for storage and reproduction 22, and the optical system to generate the light for storage becomes unnecessary. Since the light source for reproduction does not have to store information in the information storage layer compared to the light source for storage and reproduction 62, a low powered light source can be used. In the case of the optical information storing/reproducing apparatus having the foregoing construction, the spatial light modulator 68 has functions of both the generation of the light for storage and generation of the light for reproduction. Therefore, it is possible to divert the foregoing optical information storing/reproducing apparatus to the optical information reproducing apparatus by only changing the light source for storage and reproduction to the light source for reproduction.

The invention is not limited to the foregoing embodiment, and various changes may be made if necessary.

What is claimed is:

1. An optical information reproducing apparatus for reproducing in which a storage medium storing information from a holographic storage medium having reflecting layer and information storage layer in which the information is recorded in the form of interference pattern in the information storage layer as an interference pattern is illuminated with reference light for reproduction and resultant reproduction light is detected to reproduce the information, the apparatus comprising:

a light source;

a reference light for reproduction generation means for generating reference light for reproduction;

an optical system for illuminating the interference pattern recorded in the information storage layer of the holographic storage medium with the reference light for reproduction and for collecting reproduction light generated at the interference pattern when illuminated with the reference light for reproduction; and a photodetector for detecting the reproduction light;

wherein an optical system in which arrangement is made so that at least part of a light path of the reference light for reproduction when irradiated to the interference pattern is redundant with a light path of the reproduction light; and the optical system including a shut out means to let through the reproduction light and shut out reflected light of the reference light for reproduction, which is reflected by the reflecting layer of the storage medium on the redundant path are provided and the shut out means is vertically arranged for the redundant path.

2. The optical information reproducing apparatus according to claim 1, wherein the shut out means comprises a polarization plate which has an opening to let through the reproduction light without polarization and which can polarize the reference light for reproduction; and an one fourth wavelength plate which is arranged on a light path closer to the storage medium side than the polarization plate is.

3. The optical information reproducing apparatus according to claim 2, wherein the one fourth wavelength plate is an one fourth wavelength layer provided inside the holographic storage medium.

4. An optical information reproducing apparatus for reproducing in which a storage medium storing information from a holographic storage medium having reflecting layer and information storage layer in which the information is recorded in the form of interference pattern in the information storage layer as an interference pattern is illuminated with reference light for reproduction and resultant reproduction light is detected to reproduce the information, the apparatus comprising:

a light source;

a reference light for reproduction generation means for generating reference light for reproduction;

an optical system for illuminating the interference pattern recorded in the information storage layer of the holographic storage medium with the reference light for reproduction and for collecting reproduction light generated at the interference pattern when illuminated with the reference light for reproduction; and a photodetector for detecting the reproduction light;

wherein an optical system in which arrangement is made so that at least part of a light path of the reference light for reproduction when irradiated to the interference pattern is redundant with a light path of the reproduction light; and the optical system including a shut out means to let through the reproduction light and shut out reflected light of the reference light for reproduction, which is reflected by the reflecting layer of the storage medium on the redundant path are provided and the shut out means is vertically arranged for the redundant path; and the shut out means is an aperture provided with an opening having a shape which lets through all of the reproduction light and part of the reference light for reproduction, and which shuts out reflected light of the part of the reference light for reproduction, which is reflected by the storage medium.

5. The optical information reproducing apparatus according to claim 4, wherein a part of the aperture to let through the part of the reference light for reproduction and a part of the aperture to shut out the reflected light of the reference light for reproduction are symmetrical about a point centering on an optical axis.

* * * * *